United States Patent [19]

Bailey

[11] Patent Number: 5,381,589
[45] Date of Patent: Jan. 17, 1995

[54] LOAD SECURING ARRANGEMENT

[76] Inventor: John G. Bailey, P.O. Box 192, Burnt Ranch, Calif. 95527

[21] Appl. No.: 127,436

[22] Filed: Sep. 27, 1993

[51] Int. Cl.6 .............................................. F16G 11/00
[52] U.S. Cl. ................................. 24/129 R; 24/129 A
[58] Field of Search ............. 24/129 R, 129 A, 129 B, 24/131 R, 16 R, 68 CD

[56] References Cited

U.S. PATENT DOCUMENTS

| | | | |
|---|---|---|---|
| 125,795 | 4/1872 | Doubler | 24/131 R |
| 216,700 | 6/1879 | Reynolds et al. | |
| 468,819 | 2/1892 | McAnarney | |
| 545,043 | 8/1895 | Attwood et al. | 24/131 R |
| 749,235 | 1/1904 | Smith | 24/129 R |
| 796,218 | 8/1905 | Jones | |
| 808,587 | 12/1905 | Thompson | 24/129 R |
| 808,970 | 1/1906 | Clark | |
| 931,754 | 8/1909 | Greenleaf | |
| 1,205,496 | 11/1916 | Whitehead | |
| 1,389,833 | 9/1921 | Kent | 24/129 R |
| 1,565,041 | 12/1925 | Arney | |
| 1,713,106 | 5/1929 | Ulfers | |
| 2,151,664 | 3/1939 | Redfield | 24/129 |
| 2,174,192 | 9/1939 | Meighan | 24/129 |
| 2,441,336 | 5/1948 | Sova | 24/129 |
| 2,505,883 | 5/1950 | Chevalier | 24/129 R |
| 2,517,886 | 8/1950 | Koch | 24/129 R |
| 3,678,543 | 7/1972 | Hobbs | 24/230 |
| 3,930,288 | 1/1976 | Black et al. | 24/129 R |
| 4,214,350 | 7/1980 | Copelan | 24/129 R |
| 4,774,742 | 10/1988 | Johnson | 24/129 R |
| 4,910,834 | 3/1990 | Minkler | 24/129 R |
| 4,912,816 | 4/1990 | Brandt | 24/129 R |
| 5,008,983 | 4/1991 | Heins | 24/129 R |

Primary Examiner—Victor N. Sakran
Attorney, Agent, or Firm—John R. Flanagan

[57] ABSTRACT

A load securing arrangement includes an elongated flexible rope and a plurality of couplers attached to the rope. Each coupler has an eye portion and a hook portion rigidly attached at one end to the eye portion. The eye portion defines an opening therethrough. The eye portion lie along a first plane. The hook portion lies along a second plane extending in transverse relationship to the first plane. Each coupler is attached to the rope by a loop formed in the rope and inserted through the opening of the eye portion and then over the hook portion so as to permit the cinching of the loop into the form of a knot having a pair of half hitches extending about the eye portion and through the opening thereof.

13 Claims, 1 Drawing Sheet

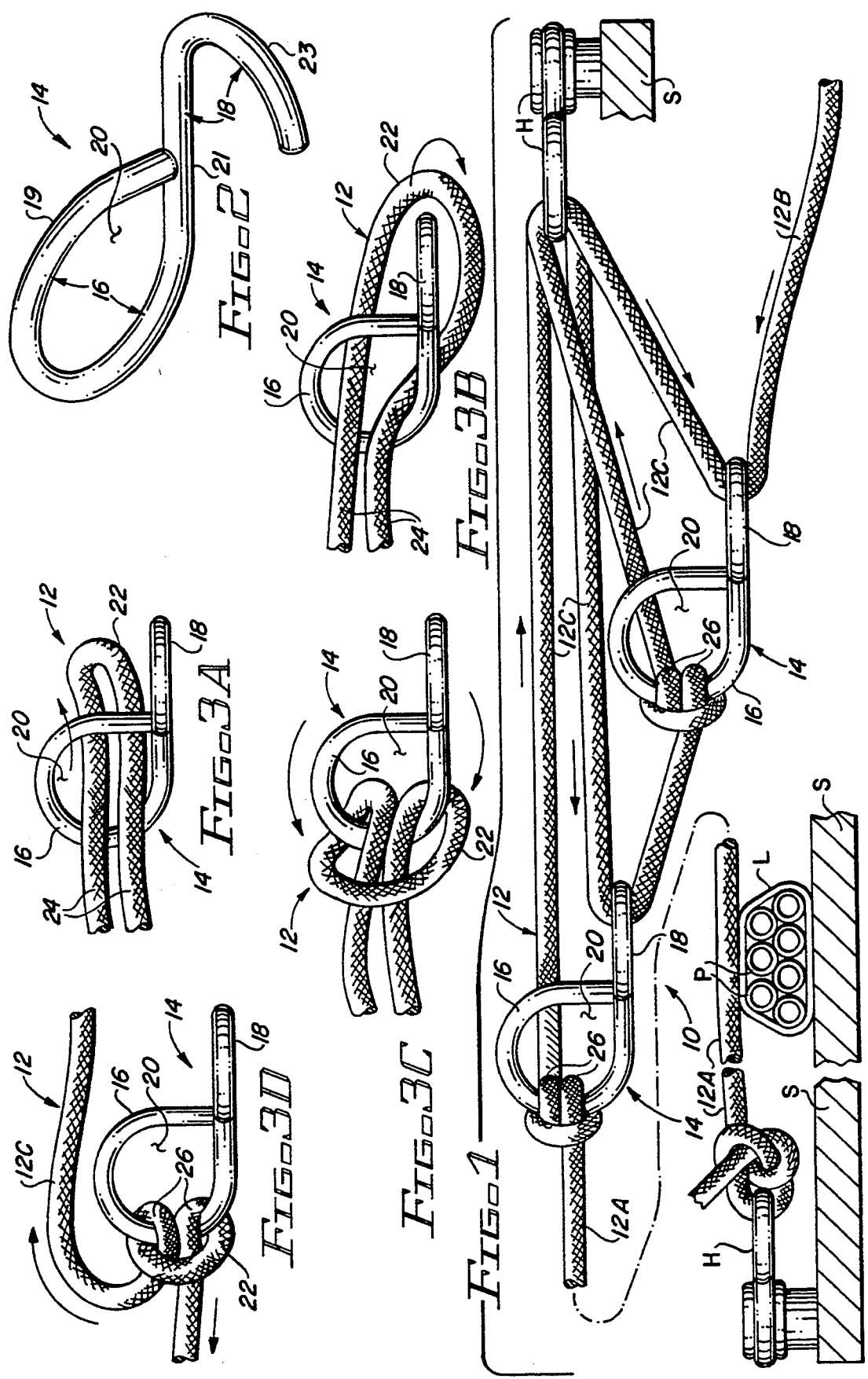

LOAD SECURING ARRANGEMENT

BACKGROUND OF THE INVENTION

1. Field of the Invention

The present invention generally relates to rope securing systems and, more particularly, is concerned with a load securing arrangement capable of use in applying tension to a rope for securing a load.

2. Description of the Prior Art

For transporting a variety of objects, such as ladders, lumber and the like, a rope or tether is typically used to secure the load to a bed or rack on the transporting vehicle. Conventional rope securing systems ordinarily utilize the rope itself to form an interlocking knot for securing the load to the bed or rack.

Such a rope securing system has several drawbacks. One drawback is that the securing system is usually ineffective due to the inability of the user to impart sufficient tension to the rope while at the same time to make a tight knot in it. Another drawback is that it usually takes much more time and is much more difficult to undo the secured rope than to secure it initially.

For more than one hundred years, many different rope securing devices have been proposed in the prior patent art for a wide variety of uses. Representative of such devices are the ones disclosed in U.S. Pat. Nos. to Reynolds et al (216,700), McAnarney (468,819), Jones (796,218), Clarke (808,970), Greenleaf (931,754), Whitehead (1,205,496), Arney (1,565,041), Ulfers (1,713,106), Redfield (2,151,664), Meighan (2,174,192), Sova (2,441,336), Hobbs (3,678,543), Black et al (3,930,288), Copelan (4,214,350), Johnson (4,774,742) and Minkler (4,910,834).

These securing devices take the form of many different designs of rigid holders, clamps, toggles and the like, for securing ropes, some of which are easier to use than others. Consequently, a need still exists for the design and arrangement of components to provide a more effective and an easier to use rope securing system.

SUMMARY OF THE INVENTION

The present invention provides a load securing arrangement designed to satisfy the aforementioned need. The load securing arrangement of the present invention incorporates a rope and a plurality of couplers mounted in spaced relation to one another along the rope. The rope and couplers of the load securing arrangement simulate a block and tackle system, without the plurality of pulleys of such system, capable of use in applying tension to the rope for securing a load. However, load securing arrangement is capable of providing more pulling power in a small area than a conventional block and tackle system. Also, the couplers are easy to disassemble from the rope for storing the rope and couplers during periods of non-use.

Accordingly, the present invention is directed to a load securing arrangement which comprises an elongated flexible rope and a plurality of couplers attachable to and detachable from the rope. Each coupler has an eye portion and a hook portion rigidly attached to one another. The coupler is made from a length of rigid rod-shaped material which is permanently bent to form the eye portion and hook portion. The eye portion is formed from one section of the rod-shaped material bent into a substantially circular closed configuration which defines an opening therethrough. The hook portion is formed from another section of the rod-shaped material, being an extension of the one section, bent into a U-shaped open configuration. The eye portion lie along a first plane and the hook portion lies along a second plane. The first and second planes extend in a generally transverse, and preferably perpendicular, relation to one another.

Each coupler is attached to the rope by a loop formed in the rope and inserted through the opening of the eye portion and then over the hook portion so as to permit cinching of the loop into the form of knot having a pair of half hitches extending about the eye portion and through the opening thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front elevational view of the load securing arrangement of the present invention.

FIG. 2 is an enlarged perspective view of one of a plurality of couplers in the arrangement of FIG. 1.

FIGS. 3A–3D are front elevational views of the successive positions of a loop formed in the rope being installed over the one coupler in order to attach the one coupler to the rope.

DETAILED DESCRIPTION OF THE INVENTION

Referring to the drawings and particularly to FIG. 1, there is illustrated a load securing arrangement, generally designated 10, of the present invention. Basically, the load securing arrangement 10 includes an elongated flexible rope 12 and a plurality of couplers 14 attachable to and detachable from the rope 12. As used herein, the term "rope" is meant in a generic sense to include other equivalent means, such as a cord, string, etc.

The rope 12 of the arrangement 10 has one end portion 12A which is attached to a hook H attached upon a load support structure (not shown), such as a rack or load bed of a truck, and routed over and/or about a load L, such as a bundle of pipe P, supported on the load bed. Also, the rope 12 has an opposite end portion 12B which ultimately will be tied down to the load support structure S. Further, the rope 12 has an intermediate portion 12C along which the couplers 14 are attached and which will cooperate with the couplers 14 to provide the desired amount of tension in the rope 12 overall to secure the load L on the load support structure S. The intermediate portion 12C of the rope 12 is routed about a second conventional hook H anchored to the load support structure S and about the respective couplers 14 so as to define a serpentine path which permits the application of a large amount of pulling force on the rope and concurrently the generation of a sufficient amount of frictional force between the rope and the couplers 14 which greatly assists the user in holding the rope in a high state of tension or tautness after the pulling force has been applied to the rope so that the opposite end portion 12B of the rope can be easily tied down to the load support structure.

Referring to FIGS. 1 and 2, the couplers 14 of the arrangement 10 are preferably substantially identical in configuration to one another. Each coupler 14 has an eye portion 16 and a hook portion 18 rigidly attached to the eye portion 16. The eye portion 16 has an opening 20 defined therethrough.

Referring particularly to FIG. 2, each of the couplers 14 is made from a length of rigid rod-shaped material, preferably a suitable metal or plastic, which is permanently bent to form the eye portion 16 and hook portion 18. The eye portion 16 is formed from a first end section 19 of the rod-shaped material bent relative to a relatively straight middle section 21 thereof into a substantially circular closed configuration therewith which defines the opening 20 therethrough. The hook portion 18 is formed from a second end section 23 of the rod-shaped material bent relative to the straight middle section 21 thereof into a substantially U-shaped open configuration therewith. The eye portion 16 so formed lies substantially flat along a first plane and the hook portion 18 so formed lies substantially flat along a second plane. As is apparent from FIGS. 1 and 2, the first and second planes of the respective eye and hook portions 16, 18 intersect one another along the longitudinal extent of the straight middle section 21 of the length of rod-shaped material and extend in a generally transverse, and preferably perpendicular, relation to one another. The eye and hook portions 16, 18 are rigidly connected in an end-to-end relation with one another by the straight middle portion 21 which forms adjacent parts of the eye and hook portions 16, 18.

FIGS. 3A through 3D show successive positions of a loop having a generally U-shaped head portion 22 and a pair of side-by-side positioned tail portions 24 formed in the intermediate portion 12C of the rope 12 being installed over one coupler 14 in order to attach the one coupler 14 to the rope 12. First, as seen in FIG. 3A, the head portion 22 of the loop is moved in a first direction along the front side of the coupler 14 adjacent the eye portion 16 of the coupler 14, through the opening 20 of the eye portion 16, then along the back side of the coupler 14. Second, as seen in FIG. 3B, the head portion 22 of the loop is then extended over the top of the hook portion 18. Third, as seen in FIG. 3C, the head portion of the loop is then slid down the front side of the hook portion 18 and of the eye portion 16. Finally, as seen in FIG. 3D, by pulling on the side-by-side tail portion 24 of the rope 12 in a second direction generally opposite to the first direction and away from the coupler 14, the head portion 22 of the loop 22 is cinched on the eye portion 16 so as to form a knot having a pair of half hitches 26 extending completely around the eye portion 16 and through the opening 20 thereof. The half hitches 26 are formed by the tail portions 24 of the loop extending through the opening 20 of the eye portion 16 and around a segment of the eye portion 16 from the front side to and around the back side thereof and by the U-shaped head portion 22 of the loop overlying the tail portions 24 thereof adjacent to the segment and front side of the eye portion 16 and extending therefrom around the segment of the eye portion 16 to the back side thereof to where the head portion 22 connects with the tail portions 24 of the loop.

The couplers 14 are so installed on the rope 12 in succession. Referring to FIG. 1, the one coupler 14, shown on the left in FIG. 1, is installed first on the rope 12. The intermediate portion 12C of the rope 12 is then routed, first, around the second hook H in one direction and, second, around the hook portion 18 of the one coupler 14 in an opposite direction. The user then applies pulling force on the opposite end portion 12B of the rope 12 to manually tighten the rope as much as possible. Next, as the user holds the rope 12 in the tigtened state, the user installs the other coupler 14, shown on the right in FIG. 1, on the rope 12. With practice such installation can be accomplished using only one hand. The user then applies more pulling force on the opposite end portion 12B of the rope 12 to manually tighten the rope 12 even further. When no more slack can be pulled from the rope, the opposite end portion 12B of the rope is tied down to the load support structure S in a conventional manner. By reversing the above-described operations, the rope 12 and couplers 14 of the arrangement 10 can be quickly and easily disassembled from one another.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A load securing arrangement, comprising:
   (a) an elongated flexible rope having a plurality of loops formed therein, each of said loop having generally U-shaped head portion and a pair of side-by-side tail portions extending from said head portion; and
   (b) a plurality of couplers, each of said couplers including an eye portion having first and second opposite sides and defining an opening through said eye portion from said first side to said second side thereof, each of said couplers also having a hook portion rigidly attached to said eye portion and extending adjacent to and outwardly from said first side thereof;
   (c) each of said loops of said rope being in the form of a cinched knot detachably attached to said eye portion of a separate one of said couplers, said cinched knot having a pair of half hitches extending completely around a segment of said eye portion of said coupler and through said opening thereof, said half hitches being formed by said tail portions of said loop extending through said opening of said eye portion and around said segment of said eye portion from said first side to and around said second opposite side thereof and by said U-shaped head portion of said loop overlying said tail portions thereof adjacent to said segment and said first side of said eye portion and extending therefrom around said segment of said eye portion to said second side thereof to where said head portion connects with said tail portions of said loop.

2. The arrangement of claim 1 wherein each of said couplers is made from a length of rigid rod-shaped material permanently bent to form said eye portion and said hook portion.

3. The arrangement of claim 2 wherein said eye portion of each of said couplers is formed from a first end section of said length of rigid rod-shaped material bent relative to a straight middle section thereof into a substantially circular closed configuration with said middle section which defines said opening therethrough.

4. The arrangement of claim 3 wherein said hook portion of each of said couplers is formed from a second end section of said length of rigid rod-shaped material bent relative to said straight middle section of said rod-shaped material into a substantially U-shaped open configuration with said middle section.

5. The arrangement of claim 4 wherein said eye and hook portions of each of said couplers lie in respective first and second planes extending in substantially perpendicular relation to one another, said respective first and second planes of said eye and hook portions transversely intersecting one another along a longitudinal extent of said straight middle portion of said length of rigid rod-shaped material.

6. The arrangement of claim 5 wherein said eye and hook portions of each of said couplers are rigidly connected together in an end-to-end relation with one another by said straight middle portion forming adjacent parts of said eye and hook portions.

7. A coupler for securing to a rope, said coupler comprising:
(a) an eye portion defining an opening and lying in a first plane; and
(b) a hook portion rigidly attached to an end of said eye portion and extending outwardly therefrom, said hook portion lying in a second plane extending in transverse relationship to said first plane;
(c) said eye portion being formed from a first end section of a length of rigid rod-shaped material permanently bent relative to a straight middle section thereof into a substantially circular closed configuration with said middle section so as to define said opening therethrough;
(d) said hook portion being formed from a second end section of said length of rigid rod-shaped material permanently bent relative to said straight middle section of said length of rigid rod-shaped material into a substantially U-shaped open configuration with said middle section;
(e) said respective first and second planes of said eye and hook portions transversely intersecting one another along a longitudinal extent of said straight middle portion of said length of rigid rod-shaped material.

8. The coupler of claim 7 wherein said eye and hook portions lying in said respective first and second planes extend in substantially perpendicular relation to one another.

9. The coupler of claim 7 wherein said eye portion and said hook portion are rigidly connected together in an end-to-end relation with one another by said straight middle portion forming adjacent parts of said eye and hook portions.

10. A method of applying tension to a rope for securing a load on a support structure, said tension applying method comprising the steps of:
(a) providing at least one coupler having first and second opposite sides and a pair of bent opposite end portions facing generally toward one another and an opening being defined through said coupler generally between said bent opposite end portions thereof;
(b) providing an elongated flexible rope secured at one end to a support structure;
(c) forming a loop in said rope having a generally U-shaped head portion and a pair of side-by-side tail portions extending from said head portion;
(d) moving said head portion of said loop in a first direction along said first side of said coupler past one of said bent opposite end portions of said coupler, through said opening of said coupler, then along said second opposite side of said coupler and over said other of said bent opposite end portions thereof;
(e) pulling on said tail portions of said loop in a second direction generally opposite to said first direction and away from said coupler to cause cinching of said head and tail portions of said loop into the form of a knot having a pair of half hitches extending completely around said one bent opposite end portion of said coupler and through said opening thereof;
(f) routing an opposite end of said rope about a securement on said support structure and then back to and around said other of said bent opposite end portions of said coupler; and
(g) pulling slack from said rope and securing said opposite end of said rope under tension to said support structure to maintain said rope under tension.

11. A method of securing a load on a support structure, said securing method comprising the steps of:
(a) providing at least one coupler having first and second opposite sides and a pair of bent opposite end portions facing generally toward one another and an opening being defined through said coupler generally between said bent opposite end portions thereof;
(b) providing an elongated flexible rope tied at one end to a load support structure and routed over a load thereon;
(c) forming a loop in a portion of said rope extending between the load and an opposite end portion of said rope, said loop having a generally U-shaped head portion and a pair of side-by-side tail portions extending from said head portion;
(d) moving said head portion of said loop in a first direction along said first side of said coupler past one of said bent opposite end portions of said coupler, through said opening of said coupler, then along said second opposite side of said coupler and over said other of said bent opposite end portions thereof;
(e) pulling on said tail portions of said loop in a second direction generally opposite to said first direction and away from said coupler to cause cinching of said head and tail portions of said loop into the form of a knot having a pair of half hitches extending completely around said one bent opposite end portion of said coupler and through said opening thereof;
(f) routing said opposite end portion of said rope about a portion of said load support structure and then back to and around said other of said bent opposite end portions of said coupler; and
(g) pulling slack from said rope and securing said opposite end of said rope under tension to said load support structure to maintain said rope extending under tension over the load on said load support structure.

12. The method of claim 11 wherein said providing said at least one coupler includes providing an eye portion defining said one of said bent opposite end portions.

13. The method of claim 11 wherein said providing said at least one coupler includes providing a hook portion defining said other of said bent opposite end portions.

* * * * *